G. B. VOLZ.
GUIDE DEVICE FOR TRACTION ENGINES.
APPLICATION FILED MAR. 18, 1918.
1,283,990.
Patented Nov. 5, 1918.
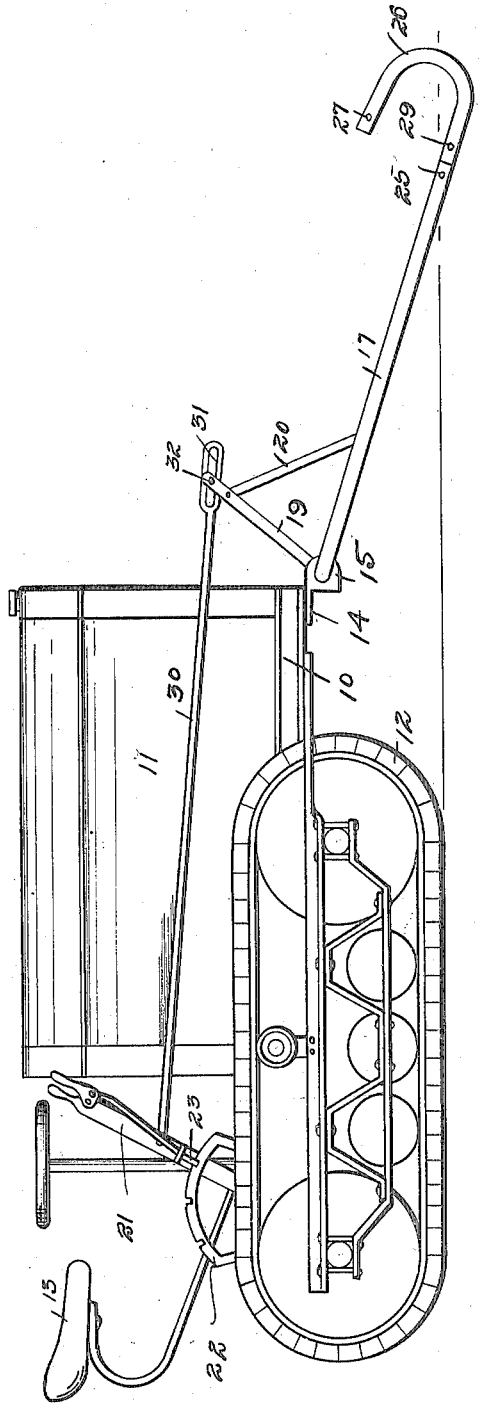
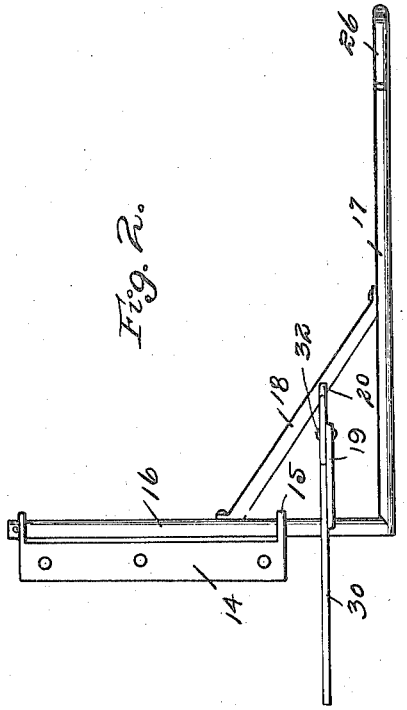
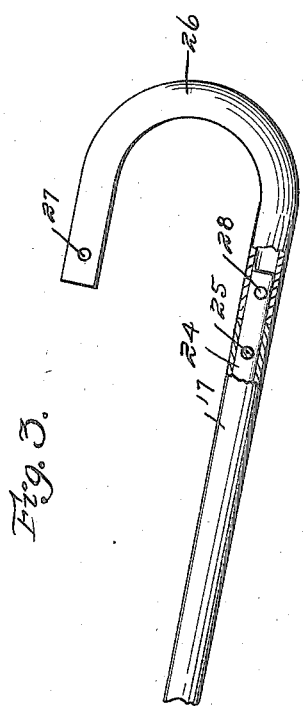
Witness
Will Freeman
Inventor
George B. Volz
By Orwig & Barr Attys

UNITED STATES PATENT OFFICE.

GEORGE B. VOLZ, OF ELKHART, IOWA.

GUIDE DEVICE FOR TRACTION-ENGINES.

1,283,990.     Specification of Letters Patent.     Patented Nov. 5, 1918.

Application filed March 18, 1918. Serial No. 223,229.

*To all whom it may concern:*

Be it known that I, GEORGE B. VOLZ, a citizen of the United States, and resident of Elkhart, in the county of Polk and State of Iowa, have invented a certain new and useful Guide Device for Traction-Engines, of which the following is a specification.

The object of my invention is to provide a guide device of durable, inexpensive and extremely simple construction for use in connection with a traction engine, preferably of the caterpillar type and having a portion adapted to travel in a furrow when the tractor is used for pulling a plow for automatically guiding the tractor during the plowing operation.

A further object is to provide such a guide device comprising a swinging arm with means for manipulating the swinging arm from the driver's seat on the tractor, and so arranged that the arm may have a certain amount of up and down play in the furrow.

Still a further object is to provide such a device having on the end of the arm which travels in the furrow a curved shoe readily detachable from the arm and reversible, so that it may be fastened on the arm at the other end of the runner.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a tractor equipped with a guide device embodying my invention.

Fig. 2 shows a top or plan view of the guide device; and

Fig. 3 shows an enlarged, detail view of the guide device, part of the shoe being shown in cross section.

In the accompanying drawings I have used the reference numeral 10 to indicate generally the frame of a tractor of the caterpillar type having the engine 11 and the caterpillar wheels 12. Mounted on the machine rearwardly of the engine is a driver's seat 13.

Secured to the frame at the forward part thereof is a plate 14 having forwardly projecting bearings 15 in which is rotatably mounted a shaft 16 which projects laterally at one side of the tractor, as illustrated in Figs. 1 and 2.

Extending forwardly from the projecting end of the shaft 16 is a guide device arm 17. A diagonal brace 18 connects the arm 17 with the shaft 16, as shown in Fig. 2.

Secured to the shaft 16 and extending upwardly therefrom is a bracket arm 19 connected with which is a brace 20 extending downwardly and forwardly to the brace 18.

Pivoted to the frame of the machine at such a point as to be convenient of access from the seat 13 is a lever 21 adjacent to a toothed sector 22. On the lever 21 is a pawl 23 adapted to coact with the sector 22.

Pivoted to the lever 21 is a link 30 extending forwardly in the machine along side the engine 11, and having at its forward end a longitudinally, elongated loop 31 in which is received a pin 32 on the brace arm 19.

The arm 17 is preferably a pipe or tube having received in its outer end a rod or the like 24 which projects forwardly beyond the free end of the arm 17. The rod 24 is secured to the arm 17 by means of a pin 25, shown in Fig. 3.

I have provided a removable and reversible shoe 26 which is preferably a U-shaped tubular member having in its ends registering openings 27. The shoe 26 is designed to be mounted on the end of the arm 17 with the rod 24 received in one of the ends of the shoe 26, as illustrated for instance in Fig. 3.

The rod 24 has a hole 28 arranged to register with the openings 27 when the shoe is installed on the arm 17 and designed to receive a pin 29 whereby the shoe may be detachably secured to the arm 17.

In the practical use of my improved guide device, when the tractor is used for plowing, the lever 21 is operated for permitting the forward end of the guide device arm to drop downwardly so that the shoe 26 may slide along the furrow.

If there are inequalities in the ground or in the furrow the shoe 26 may still travel along the bottom of the furrow on account of the play which is allowed by using the elongated loop or slot 31 at the end of the link 30.

The parts are so arranged that for ordinary plowing and under ordinary conditions when the shoe is dropped into the furrow the pin 32 will be at about the middle of the loop 31. When it is desired to travel on a road or make a turn or the like, the lever 21 is drawn rearwardly for raising the arm 17.

It will be seen that my guide device is of very simple and inexpensive construction. It can be readily and easily attached on a caterpillar tractor or removed therefrom.

Sufficient play of the shoe 26 is allowed to prevent it from jumping out of the furrow at any time.

It will be seen that the shoe 26, which receives the greatest wear during the use of the device, may be quickly and easily removed from the arm 17 and replaced for a new shoe. It will also be seen that the position of the shoe may be reversed and that either end may be secured to the arm 17 so as to bring the wear on different parts of the shoe 26.

Incidentally it may be noted that in very deep plowing the shoe 26 can be turned over, so that the free end is down, but the shoe is not ordinarily used in such position.

Some changes may be made in the construction and arrangement of the various parts of my improved guide device without departing from the essential features and purposes of my invention, and it is my intention to cover by my present application any modified forms of structure or use of mechanical equivalents which may be reasonably included within the scope of my claims.

I claim as my invention:

1. In a device of the class described, an arm designed to be pivoted to swing in a substantially vertical plane, means for raising said arm, a shoe comprising a substantially U-shaped member, and means for securing either end of said shoe to said arm.

2. A guide device for use with tractors, comprising a plate designed to be secured to the tractor frame, having bearings, a shaft mounted in said bearings, an arm fixed to said shaft, a bracket arm secured to said shaft, a lever, means for locking said lever in different positions of its movement, a link pivoted to said lever and connected with said bracket arm for limited sliding movement, a tubular U-shaped shoe, and means for securing either end of said shoe to the free end of said first arm.

Des Moines, Iowa, January 16, 1918.

GEO. B. VOLZ.